United States Patent
Cho et al.

(10) Patent No.: US 7,629,073 B2
(45) Date of Patent: Dec. 8, 2009

(54) SAFETY ELEMENT FOR BATTERY AND BATTERY WITH THE SAME

(75) Inventors: Jeong Ju Cho, Daejeon (KR); Jae Hyun Lee, Daejeon (KR); Sung Kyun Chang, Daejeon (KR); Min Chul Jang, Daejeon (KR); Sun Sik Shin, Daejeon (KR); Eui Yong Bang, Gunsan-si (KR); Joon Hwan Lee, Daejeon (KR); Soo Hyun Ha, Busan (KR)

(73) Assignee: LG Chem, Ltd. (KR)

( * ) Notice: Subject to any disclaimer, the term of this patent is extended or adjusted under 35 U.S.C. 154(b) by 812 days.

(21) Appl. No.: 11/132,468

(22) Filed: May 19, 2005

(65) Prior Publication Data
US 2005/0260486 A1    Nov. 24, 2005

(30) Foreign Application Priority Data
May 19, 2004    (KR)    ............. 10-2004-0035567

(51) Int. Cl.
*H01M 10/50*    (2006.01)
*H01M 2/00*    (2006.01)
(52) U.S. Cl. ................. 429/62; 429/61; 429/56; 429/7; 429/96; 338/25
(58) Field of Classification Search ............. 429/62, 429/61, 56, 7, 96; 338/25
See application file for complete search history.

(56) References Cited

U.S. PATENT DOCUMENTS

| | | | |
|---|---|---|---|
| 5,766,793 A | 6/1998 | Kameishi et al. | |
| 6,045,939 A | 4/2000 | Tateno et al. | |
| 6,150,051 A | 11/2000 | Du Pasquier et al. | |
| 6,391,491 B1 | 5/2002 | Kim | |
| 6,977,343 B2 * | 12/2005 | Furuta et al. | 174/98 |

FOREIGN PATENT DOCUMENTS

| | | | |
|---|---|---|---|
| JP | 04348001 | | 3/1992 |
| JP | 05-074493 | * | 3/1993 |
| JP | 05074493 | | 3/1993 |
| JP | 09134714 | | 5/1997 |
| JP | 11111186 | | 4/1999 |
| JP | 11273651 | | 8/1999 |

(Continued)

OTHER PUBLICATIONS

RU 2006145031 Office Action from Patent Office of the Russian Federation dated Mar. 29, 2007; English Translation; 5 pages.

(Continued)

*Primary Examiner*—Laura S Weiner
(74) *Attorney, Agent, or Firm*—Cantor Colburn LLP

(57) ABSTRACT

Disclosed are a safety element for a battery, which is provided with material having a Metal-Insulator Transition (MIT) characteristic where resistance abruptly drops at or above a certain temperature, and a battery with such a safety element. This battery with an MIT safety element is turned into a stable discharged state when it is exposed to an elevated temperature or a battery temperature rises due to external impact, so that it can ensure its safety.

12 Claims, 3 Drawing Sheets safety element connected to interior of cell safety element connected to exterior of cell

FOREIGN PATENT DOCUMENTS

KR  10-20030024156  3/2003
RU  2074442 C1  2/1997

OTHER PUBLICATIONS

Chinese Office Action dated Feb. 22, 2008 for Application No. 200580011160.5.

Russian Notice of Allowance dated Sep. 13, 2007 for Application No. 2006145031/09(049166).

Korean Intellectual Property Office, PCT International Search Report, Date of Mailing: Aug. 24, 2005.

Hyun-Tak Kim et al., Gate-Induced Mott Transition, Telecom. Basic Research Lab., ETRI, May 27, 2003.

* cited by examiner safety element connected to interior of cell safety element connected to exterior of cell 1. negative electrode lead
2. positive electrode lead
3. polymer battery
4. MIT safety element resistance change: with the rise of temperature resistance change: with the fall of temperature

SAFETY ELEMENT FOR BATTERY AND BATTERY WITH THE SAME

The present document is based on Korean Priority Document KR2004-35567, filed in the Korean Patent Office on May 19, 2004, the entire contents of which being incorporated herein by reference.

BACKGROUND OF THE INVENTION

1. Field of the Invention

The present invention relates to a safety element for a battery, which is provided with material having a Metal-Insulator Transition (MIT) characteristic where resistance abruptly drops at or above a certain temperature, and to a battery with such a safety element.

2. Description of the Related Art

In recent, active interest has been taken in energy storage technologies. Of them, an effort to research and develop a battery becomes more and more materialized as its application field is expanded into a mobile phone, a camcorder and a notebook as well as even into an electric vehicle energy source. In terms of this, an electrochemical device is the most noteworthy field, and among others, development of a secondary battery capable of being charged and discharged is now in the spotlight. From among secondary batteries in current use, a lithium ion secondary battery, which has been developed in the early 1990's, has an advantage over conventional batteries using aqueous electrolyte such as Ni-MH, Ni—Cd and $H_2SO_4$—Pb batteries in that its operating voltage is high and its energy density is extraordinarily large.

However, when a battery temperature rises in a charged state due to environmental changes such as external impact by pressure, nails or nippers, the rise of an ambient temperature, overcharging or the like, the lithium ion secondary battery is subjected to swelling caused by a reaction of electrode active material and an electrolyte and is even in danger of firing or explosion.

In particular, since positive electrode active material is sensitive to a voltage, reactivity between the positive electrode and the electrolyte is enhanced as the battery is charged and so the voltage becomes higher, which not only causes dissolution of a positive electrode surface and oxidation of the electrolyte, but also increases the risk of firing or explosion.

The more energy density is increased owing to high-capacity of a battery, in particular, a non-aqueous electrolytic secondary battery such as a lithium secondary battery, the more and more such a safety problem becomes important.

SUMMARY OF THE INVENTION

It is an object of the present invention to enhance battery safety by lowering a charged state of the battery before the battery is damaged due to an elevated temperature. To achieve the objective, a safety element is externally or internally connected to the battery, the safety element being provided with material having large change in resistance such that an electric current abruptly flows through it at or above a certain temperature while no large current leakage occurs at a normal use temperature of the battery.

According to the present invention, there are provided a safety element which is provided with material having a Metal-Insulator Transition (MIT) characteristic where resistance abruptly drops at or above a certain temperature, and a battery positive and negative electrodes of which are connected to each other through such a safety element.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Hereinafter, the present invention will be explained in more detail.

According to the present invention, a battery is characterized by comprising a safety element connected between its positive and negative electrodes, the safety element comprising material having a Metal-Insulator Transition (MIT) characteristic where resistance abruptly drops at or above a certain temperature, as a way to sense the rise of a battery temperature and lower a charged state of the battery when the battery is exposed to an elevated temperature or the battery temperature rises due to external impact by pressure, nails or nippers, the rise of an ambient temperature or overcharging.

Figure 2:
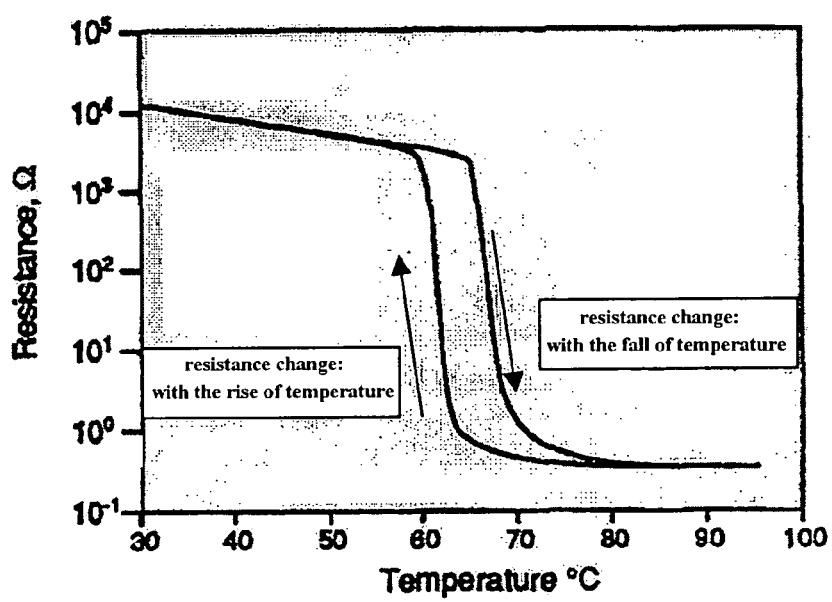
FIG. 2 is a graph showing resistance change characteristics with the rise or fall of an MIT material temperature.

The MIT characteristic is a material-specific characteristic which is presented by only materials including vanadium-based oxides such as VO, $VO_2$ or $V_2O_3$ and $Ti_2O_3$ material or such materials to which an element such as St, Ba, La, etc. is added, where resistance of the materials abruptly changes according to a temperature (See FIG. 2). The change in resistance is caused by phase transition of a crystalline structure between a metal and an insulator.

A difference between a safety element provided with material having an MIT characteristic (hereinafter briefly referred to as 'MIT safety element') and a Negative Temperature Coefficient (NTC) safety element, and the superiority of the MIT safety element over the NTC safety element are as follows:

In contrast with general metals, material having an NTC characteristic (hereinafter briefly referred to as 'NTC material') is a semiconductor element having a negative temperature coefficient characteristic where resistance decrease with the rise of a temperature. A semiconductor is characterized in that its resistivity decreases with the increase of a temperature.

Therefore, material having the MIT characteristic (hereinafter briefly referred to as 'MIT material') where phase transition occurs between a metal and an insulator is quite different from the NTC material.

Figure 3:
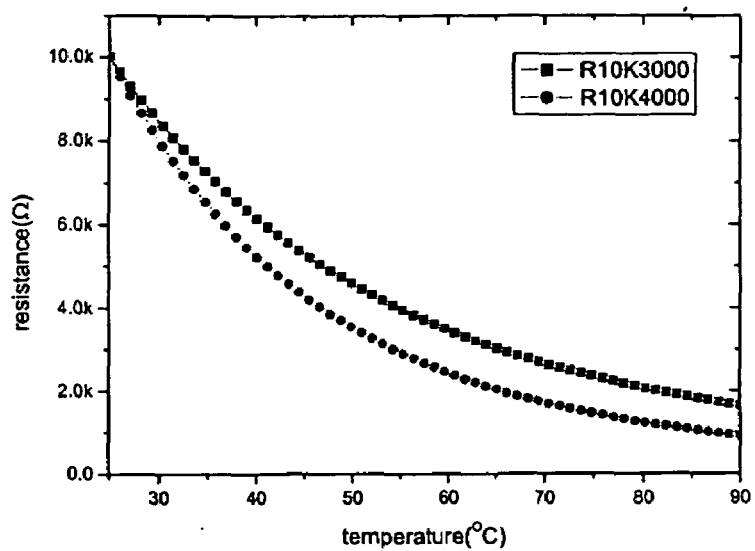
FIG. 3 is a graph showing resistance change curves for ordinary NTC elements, wherein R10K3000 signifies an NTC element having constant B of 3000 and R10K4000 signifies an NTC element having constant B of 4000.

Also, dissimilarly to the MIT safety element of the present invention, it is difficult to apply the NTC safety element to a lithium ion secondary battery. Resistance change curves for ordinary NTC elements are shown in FIG. 3.

The NTC material has constant B of about 3000 to 4000 between a normal temperature and 150° C., wherein resistance change is $R_i = R_o \exp \{B(1/T_i - 1/T_o)\}$ ($R_i$: resistance value at temperature $T_i$, $R_o$: resistance value at temperature $T_o$). The NTC material must have a resistance value of at least 10 kΩ to 5 kΩ so that it can operate without a problem such as current leakage at a normal temperature. In this case, the NTC material cannot flow enough electric current to safely protect a battery when a temperature rises. Accordingly, NTC material having low resistance at a normal temperature must be used in order to have a sufficient flow of electric current.

However, when using NTC material having low resistance, for example having a resistance value of 1 kΩ, at a normal temperature, an electric current of about 4 mA flows at a voltage of 4.2 V (conventional secondary battery charging voltage) and a leakage current flows at a usual use temperature of the battery, leading to an overdischarged state. The battery in an overdischarged state exhibits a phenomenon in which performance of the battery abruptly deteriorates due to dissolution of Cu, etc., on a negative electrode. Moreover, a safety element consisting of NTC material having a low initial resistance value may collapse when an excess electric current flows at an elevated temperature, so that the safety element loses its capability as an NTC element and resistance increases. Such an element is transformed into an element not coinciding with the purpose of the present invention. Furthermore, since resistance of the NTC material does not decrease at a specific temperature, but decrease with the rise of a temperature, the NTC material has another disadvantage in that a leakage current becomes larger at a battery's usable temperature of 50° C. to 60° C. even in a case of NTC material having a very low leakage current at a normal temperature. As an example, 10 kΩ-NTC material having constant B of 4000 shows about a leakage current of 2 mA at a temperature of 60° C.

Contrary to the NTC material, MIT material experiences resistance change only in a specific temperature range and exhibits insulating characteristic having no influence on the battery at a battery's usable temperature of −20° C. to 60° C. This phenomenon is attributed to structural change of crystalline and mostly occurs in vanadium-based materials such as VO, $VO_2$ or $V_2O_3$. Also, since such materials have the width of resistance change in order of $10^2$ or more, a sufficient electric current can flow through them only when a temperature rises to or above a critical point and thus enable a battery to rapidly become a discharged state, while no large current leakage occurs at a battery's usable temperature.

A critical temperature of the MIT material for resistance change preferably lies in a range of 50° C. to 150° C. On one hand, if resistance decreases at a temperature lower than 50° C., a battery is discharged at its normal use temperature between 20° C. and 60° C. to reduce residual capacity of the battery. On the other hand, if resistance decreases at a temperature higher than 150° C., this decrease of resistance has no influence on battery safety because the battery has been already swelled, fired or exploded due to external impact or environmental changes.

Hereinafter, a description will be given for the structure of an MIT safety element and its connection to a battery.

According to a first preferred embodiment of the present invention, an MIT safety element is constructed by connecting a metal lead wire having high electrical conductivity to any two places of MIT material having a certain form, respectively without bringing into contact with each other and the so-constructed MIT safety element is connected to positive and negative electrode terminals of a battery through the two lead wires. In order to strengthen durability of the MIT safety element, the MIT material portion of the MIT safety element may be sealed with packing material such as epoxy or glass.

According to a second preferred embodiment of the present invention, an MIT safety element is constructed in the form of a chip and the so-constructed MIT safety element may be connected directly to positive and negative electrode terminals of a battery.

According to a third preferred embodiment of the present invention, an MIT safety element is constructed in the form of a chip both ends of which is coated with metal films and the so-constructed MIT safety element may be connected directly to positive and negative electrode terminals of a battery.

Insofar as positive and negative electrodes of a battery can be physically connected to each other, there is no limitation on the form and the position of the MIT safety element. For example, the safety element of the present invention may be provided inside or outside of a cell, or in a protective circuit (See FIG. 1).

Hereinafter, operating mechanism of a battery with an MIT safety element of the present invention will be described in detail.

If both positive and negative electrode terminals of a battery are connected to each other using MIT material inside or outside of the battery, an electric current does not flow through the MIT material between the positive and negative electrodes at a normal use temperature of the battery because the MIT material has very large resistance at that temperature. That is, the MIT material has no influence on the battery. However, if the battery is exposed to an elevated temperature or the battery temperature rises due to external impact and thus the battery is at or above a certain temperature, resistance of the MIT material abruptly drops and an electric current flows through the MIT material between the positive and negative electrodes, which causes the battery to be discharged and thus turns it into a safe state.

Thus, when the MIT safety element is used in a battery, explosion or firing does not occur even if the battery is exposed to an elevated temperature. If a temperature is lowered again, resistance of the MIT material becomes larger again and an electric current does not flow any more, so that the battery can be used normally.

Figure 1:
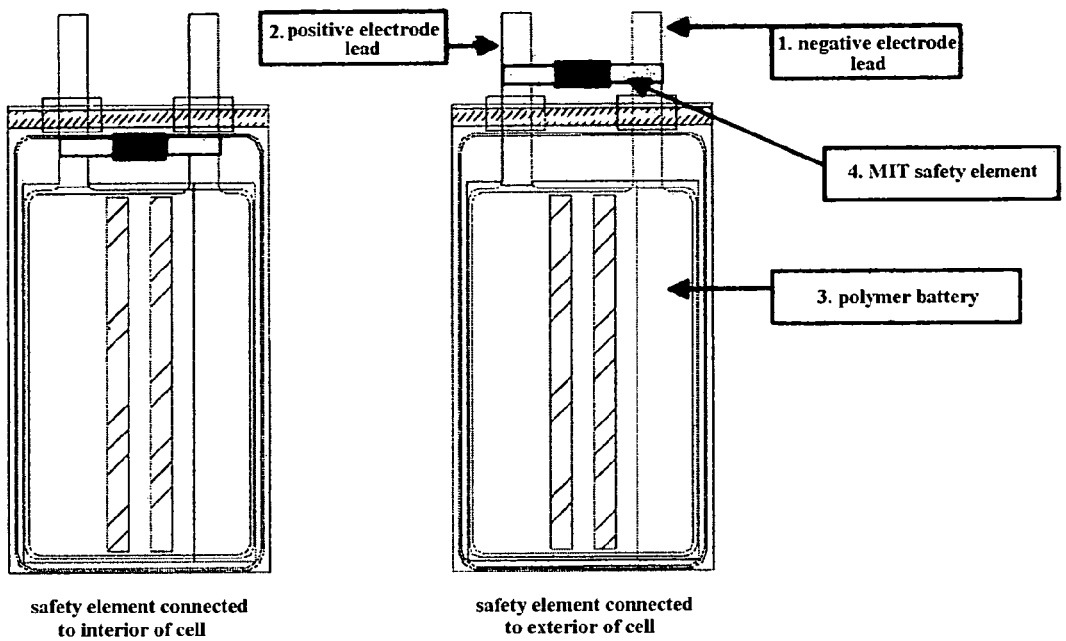
FIG. 1 is schematic view of a secondary battery to which an MIT safety element is connected according to the present invention, wherein a battery on a left side represents an embodiment of the MIT safety element connected to the interior of a cell and a battery on a right side represents an embodiment of the MIT safety element connected to the exterior of the cell.

FIG. 1 illustrates two concrete states in which the MIT safety element is connected to a secondary battery in different manners in accordance with preferred embodiments of the present invention.

In these embodiments shown in FIG. 1, the MIT safety element of the present invention is connected to a polymer battery.

In general, a polymer battery has a laminate-type structure and includes one or more positive electrode plates and one or more negative electrode plates alternately laminated with the positive electrode plates. In this laminate-type battery, a positive electrode lead connecting the one or more positive electrode plates to each other and to the exterior of a cell, and a negative electrode lead connecting the one or more negative electrode plates to each other and to the exterior of the cell are connected to a power source located outside of a cell packing material.

The MIT safety element of the present invention in which the MIT material is connected in parallel to a middle portion of a metal connector is connected between the positive and negative electrode leads inside or outside of the cell packing material.

In a case of a lithium secondary battery, it fires or explodes when heated to or above 160° C. in a charged state. However, if the MIT material, resistance of which changes in a temperature range of 50° C. to 150° C., is connected in parallel to positive and negative electrode terminals of the lithium secondary battery, an electric current flows toward the MIT material through which the electric current has not flowed hitherto to change the charged lithium secondary battery into a discharged state because resistance of the MIT material abruptly drops in the above-mentioned temperature range. That is, the lithium secondary battery will not fire or explode even if it is heated to or above 160° C.

Hereinafter, the present invention will be described in more detail with reference to the following Examples, which should not be construed as limiting the scope of the present invention.

EXAMPLE 1

A cell was constructed such that its positive electrode consists of positive electrode active material ($LiCoO_2$), a conducting agent and a binder (composition ratio of 95:2.5:2.5), and its negative electrode consists of negative electrode active material (carbon), a conducting agent and a binder (composition ratio of 94:2:4). An insulating membrane was interposed between the positive and negative electrodes, EC:EMC containing 1 M $LiPF_6$ was used as an electrolyte, and a pouch was used as external packing material. In this way, a polymer battery was formed. An MIT safety element (vanadium-based oxide) having resistance of 25 kΩ at a normal temperature was connected in parallel between the positive and negative electrode terminals of the so-formed polymer battery.

Figure 4:
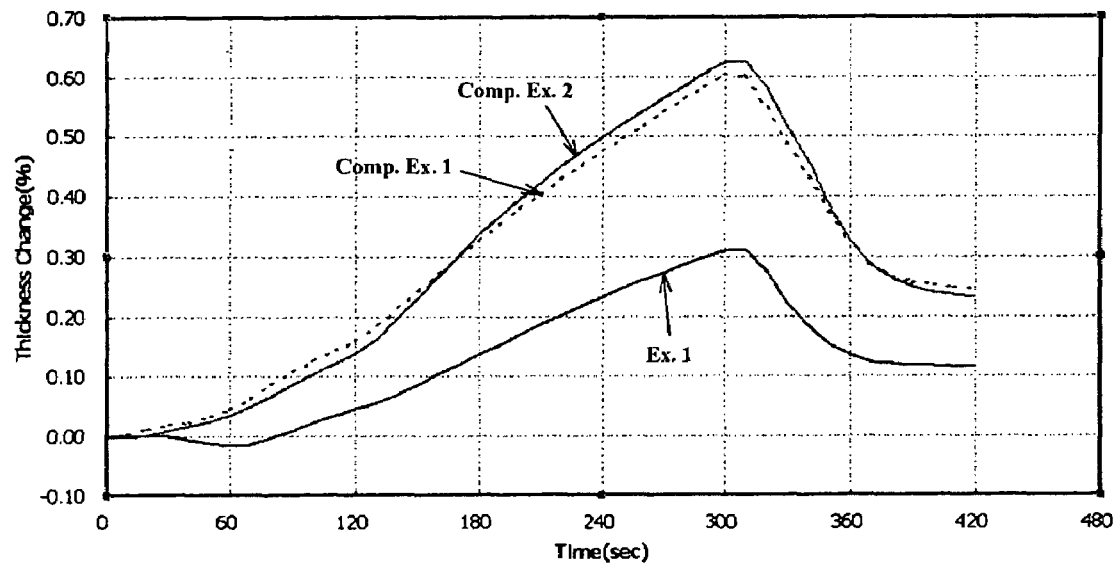
FIG. 4 is a graph showing changes in thickness of polymer batteries according to Example 1, Comparative Examples 1 and 2, measured after the polymer batteries are exposed to an elevated temperature.

(1) For an elevated temperature test, the polymer battery was placed in a oven, and change in thickness of the battery was measured while an oven temperature was raised from 25° C. to 90° C. for an hour, maintained at 90° C. for 5 hours and lowered to 25 for an hour. A result of this test is shown in FIG. 4.

Figure 5:
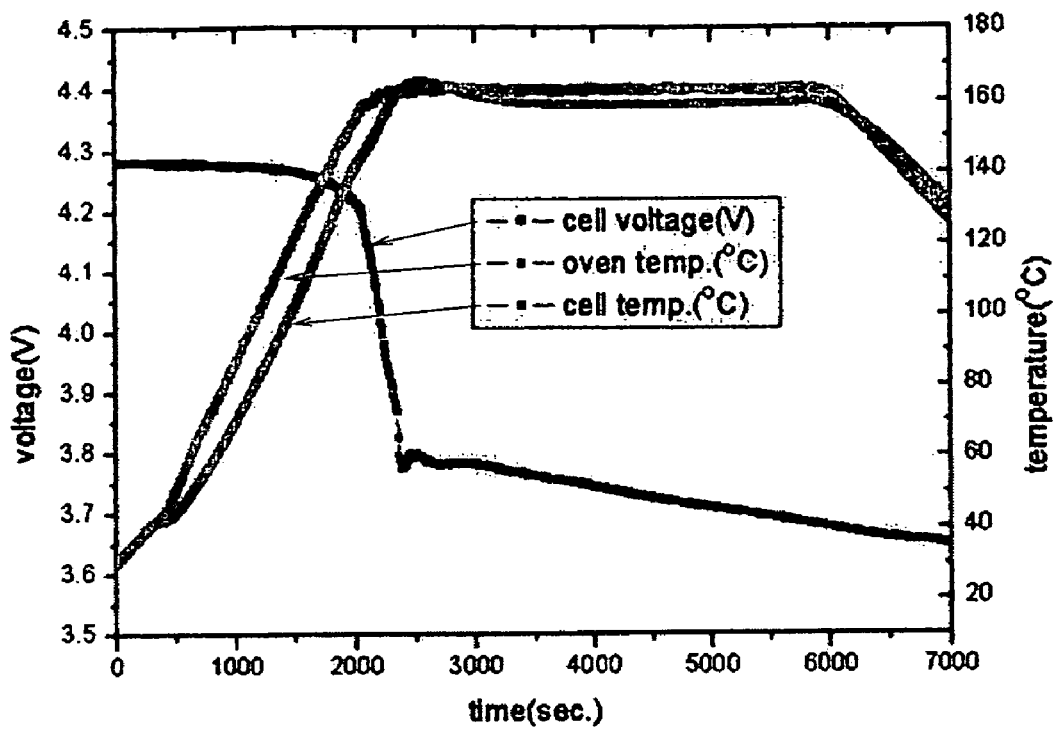
FIG. 5 is a graph showing a hotbox test result for a polymer battery with the MIT safety element according to Example 1.

(2) For a hotbox test, the battery to which the MIT safety element had been connected was charged up to 4.3 V, and then was placed in an oven. Thereafter, changes in voltage and temperature of the battery were measured while an oven temperature was raised from a normal temperature to 160° C. at a rate of 5° C./min, maintained at 160° C. for an hour and lowered to a normal temperature by air cooling. A measurement result is shown in FIG. 5, and the battery did not explode.

COMPARATIVE EXAMPLE 1

Figure 6:
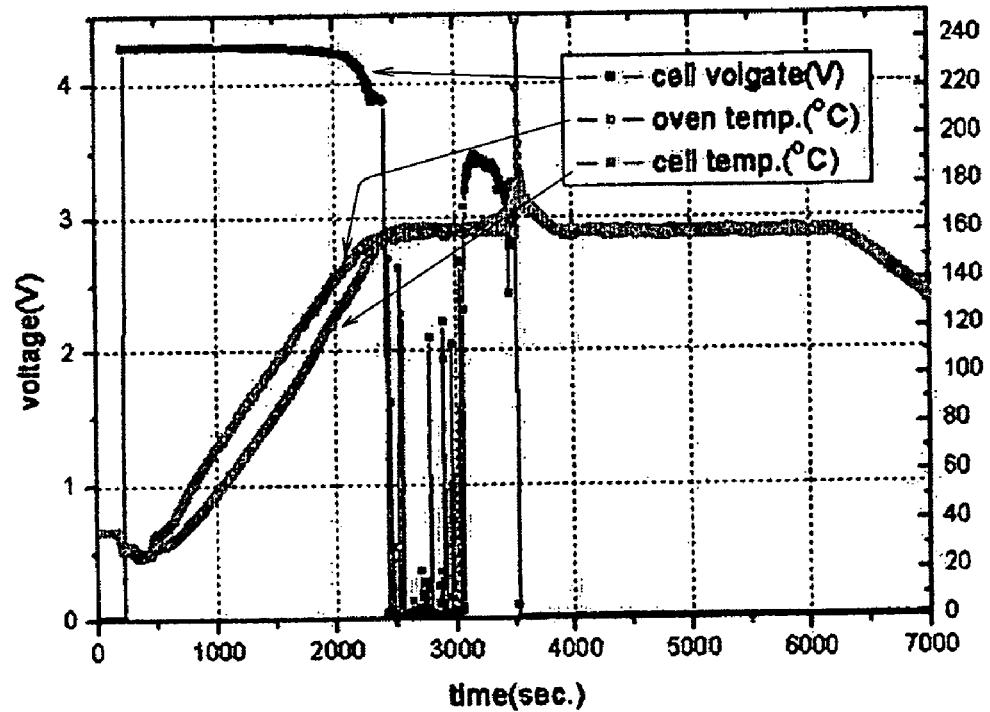
FIG. 6 is a graph showing a hotbox test result for a polymer battery without the MIT safety element according to Comparative Example 1.

Change in thickness at an elevated temperature was measured and a hotbox test was conducted in the same manner as that of Example 1, except that an MIT safety element was not connected to a polymer battery constructed as in Example 1. A measurement result of the change in thickness at an elevated temperature is shown in FIG. 4 and a result of the hotbox test is shown in FIG. 6. As the result of the hotbox test, the battery according to Comparative Example 1 exploded.

COMPARATIVE EXAMPLE 2

Chang in thickness at an elevated temperature was measured in the same manner as that of Example 1, except that, instead of an MIT safety element, an NTC element (constant B=4000) having resistance of 10 kΩ at a normal temperature was connected in parallel to positive and negative electrode terminals of a polymer battery constructed as in Example 1. A measurement result is shown in FIG. 4.

In a case of the polymer battery with the NTC element, a leakage current of 2 mA was generated at a temperature of 60° C.

As described above, a battery with an MIT safety element according to the present invention is turned into a stable discharged state when it is exposed to an elevated temperature or a battery temperature rises due to external impact, etc., so that it can ensure its safety.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A safety element for battery, comprising:
a Metal-Insulator Transition (MIT) member connecting a positive electrode and a negative electrode of the battery to each other, the MIT member including an MIT material wherein the electrical resistance of the MIT material abruptly drops at or above a critical temperature by a phase transition from an insulator into a metal to allow electrical current to flow between the positive and negative electrodes,
the critical temperature is in the range of from 50° C. to 150° C., and
the MIT material is selected from the group consisting of $VO$, $VO_2$, $V_2O_3$ and $Ti_2O_3$.

2. The safety element as claimed in claim 1, wherein an element of St, Ba, or La is added to the MIT material.

3. The safety element as claimed in claim 1, wherein a metal lead wire having high electrical conductivity is connected to any two places of the MIT member, respectively without bringing into contact with each other.

4. The safety element as claimed in claim 1, wherein the MIT member is constructed in the form of a chip.

5. The safety element as claimed in claim 1, wherein the MIT member is constructed in the form of a chip and both ends of the chip are coated with a metal film.

6. The safety element as claimed in claim 1, wherein the MIT member is sealed with packing material.

7. A battery including positive and negative electrodes connected to each other through a safety element, the safety element comprising:
a Metal-Insulator Transition (MIT) member including an MIT material wherein the electrical resistance of the MIT material abruptly drops at or above a critical temperature by a phase transition from an insulator into a metal to allow electrical current to flow between the positive and negative electrodes,
the critical temperature is in the range of from 50° C. to 150° C., and
the MIT material is selected from the group consisting of $VO$, $VO_2$, $V_2O_3$ and $Ti_2O_3$.

8. The battery as claimed in claim 7, wherein an element of St, Ba, or La is added to the MIT material.

9. The battery as claimed in claim 7, wherein a metal lead wire having high electrical conductivity is connected to any two places of the MIT member, respectively without bringing into contact with each other.

10. The battery as claimed in claim 7, wherein the MIT member is constructed in the form of a chip.

11. The battery as claimed in claim 7, wherein the MIT member is constructed in the form of a chip and both ends of the chip are coated with a metal film.

12. The battery as claimed in claim 7, wherein the MIT member is sealed with packing material.

* * * * *